US007712316B2

(12) United States Patent
Spangler

(10) Patent No.: US 7,712,316 B2
(45) Date of Patent: May 11, 2010

(54) TURBINE BLADE WITH REVERSE COOLING AIR FILM HOLE DIRECTION

(75) Inventor: Brandon W. Spangler, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 277 days.

(21) Appl. No.: 11/651,226

(22) Filed: Jan. 9, 2007

(65) Prior Publication Data

US 2008/0163604 A1 Jul. 10, 2008

(51) Int. Cl.
*F02C 7/12* (2006.01)

(52) U.S. Cl. ........................ 60/806; 416/97 A; 415/115

(58) Field of Classification Search ........... 60/754–757, 60/806; 415/115, 116; 416/97 A, 97 R, 96 R
See application file for complete search history.

(56) References Cited

U.S. PATENT DOCUMENTS 4,653,983 A 3/1987 Vehr
5,419,681 A * 5/1995 Lee .......................... 416/97 R
5,503,529 A * 4/1996 Anselmi et al. ........... 416/97 R
6,164,913 A * 12/2000 Reddy ....................... 416/97 R
6,234,755 B1 * 5/2001 Bunker et al. ............. 416/97 R
2008/0152475 A1 * 6/2008 Zausner et al. ................. 415/1

* cited by examiner

*Primary Examiner*—Michael Cuff
*Assistant Examiner*—Phutthiwat Wongwian
(74) *Attorney, Agent, or Firm*—Carlson, Gaskey & Olds

(57) ABSTRACT

A gas turbine engine includes turbine blades having film cooling holes at an outer face of an airfoil wherein the film cooling holes are designed to be better filled with air. In a disclosed embodiment, the film cooling holes include a meter section extending along a direction having a main component extending from a blade tip to a blade root. In addition, a diffused section communicates with the meter section at a face of the airfoil. The diffused section is spaced toward the blade tip from the meter section. In this manner, centrifugal force ensures the diffused section is also filled with air.

10 Claims, 3 Drawing Sheets

TURBINE BLADE WITH REVERSE COOLING AIR FILM HOLE DIRECTION

BACKGROUND OF THE INVENTION

This application relates to a turbine blade, wherein the meter sections of film cooling holes extend at an angle and in a direction toward a blade root from the blade tip. In addition, a diffused section of a film cooling hole extends toward the blade tip from a meter section to receive air driven by centrifugal force.

Gas turbine engines are known, and include a plurality of sections which are typically mounted in series. Typically a fan delivers air to a compressor. Air is compressed in the compressor and delivered downstream to be mixed with fuel and combusted in a combustor section. Products of combustion move downstream over turbine rotors. The turbine rotors include a plurality of removable blades which rotate with the rotors, and are driven by the products of combustion. The turbine rotors drive components within the gas turbine engine, including the fan and compressor.

The turbine blades become quite hot from the products of combustion. Thus, it is known to pass cooling air through internal cooling passages within the turbine blades. In one known cooling technique, air is passed outwardly through holes on an outer face of an airfoil of the turbine blade, such that the cool air passes along the outer face. These film cooling holes are designed to maximize the coverage surface area on the blade, which receives the air and also to maximize the time cooling air is kept on a face of the blade.

In the prior art, the film cooling holes have a meter section that typically extend at an angle to the outer face. The angle includes a major component in a direction extending from a blade root and toward a blade tip. In addition, a diffused section extends back from this meter section towards the blade root. This type of film cooling holes is known as shaped or flared holes. The purpose of the diffused section is to slow the speed of the cooling air down as it reaches the face of the blade, such that the air would be less likely to move away from the face, and more likely to move along the face.

However, in the prior art, a centrifugal force applied as the blade rotates, moves the cooling air radially outwardly and toward the blade tip. Thus, the diffused section tends not to be filled with air. This centrifugal force and flow momentum drives the air into the radially outer portions of the holes spaced toward the tip, and leaves the diffused section less filled. Thus, the air exits the film cooling hole at a greater velocity, and does not stay on the face of the blade as long as would be desired.

SUMMARY OF THE INVENTION

In a disclosed embodiment of this invention, the meter section of film cooling holes in a turbine blade extend with a major component in a direction from the blade tip toward the blade root. A diffused section is formed to enlarge a film cooling hole at the outer face of the blade. The diffused section extends toward the blade tip from the meter section.

As the blade rotates, and cooling air exits the film cooling hole, centrifugal force forces some of the cooling air into the diffused section and the diffused section is relatively full compared to the prior art. Thus, the air exits the film cooling hole at a lower velocity than in the prior art, tends to stay on the face of the turbine blade longer, and cover a greater surface area.

These and other features of the present invention can be best understood from the following specification and drawings, the following of which is a brief description.

DETAILED DESCRIPTION OF THE PREFERRED EMBODIMENT

Figure 1:
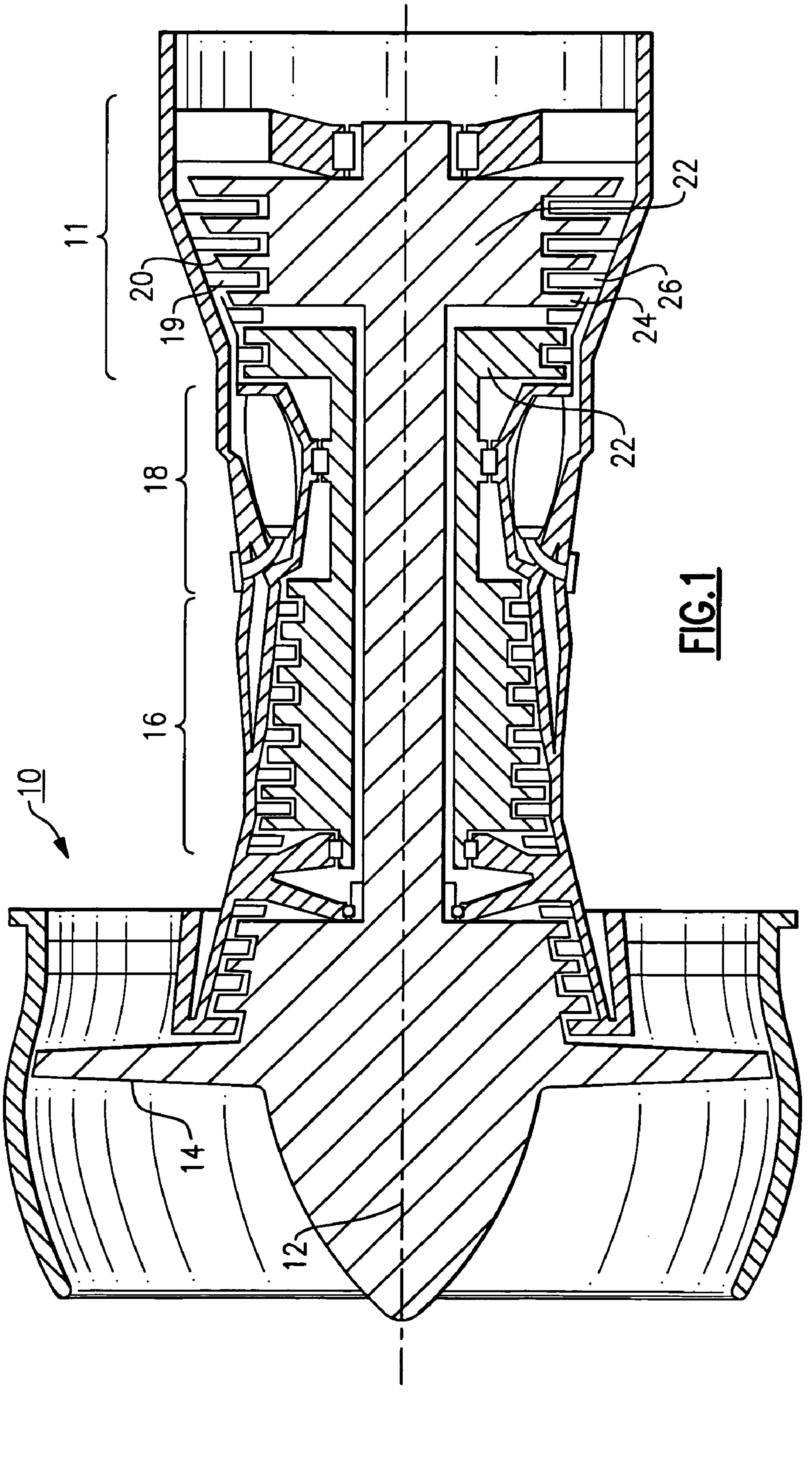
FIG. 1 is a schematic view of a gas turbine engine.

A gas turbine engine 10 circumferentially disposed about an engine centerline, or axial centerline axis 12 is shown in FIG. 1. The engine 10 includes a fan 14, a compressor 16, a combustion section 18 and a turbine 11. As is well known in the art, air compressed in the compressor 16 is mixed with fuel and burned in the combustion section 18 and expanded in turbine 11. The turbine 11 includes rotors 22 which rotate in response to the expansion, driving the compressor 16 and fan 14. The turbine 11 comprises alternating rows of rotary airfoils or blades 24 and static airfoils or vanes 26. In fact, this view is quite schematic, and blades 24 and vanes 26 are actually removable. It should be understood that this view is included simply to provide a basic understanding of the sections in a gas turbine engine, and not to limit the invention. This invention extends to all types of turbine engines for all applications.

Figure 2A:
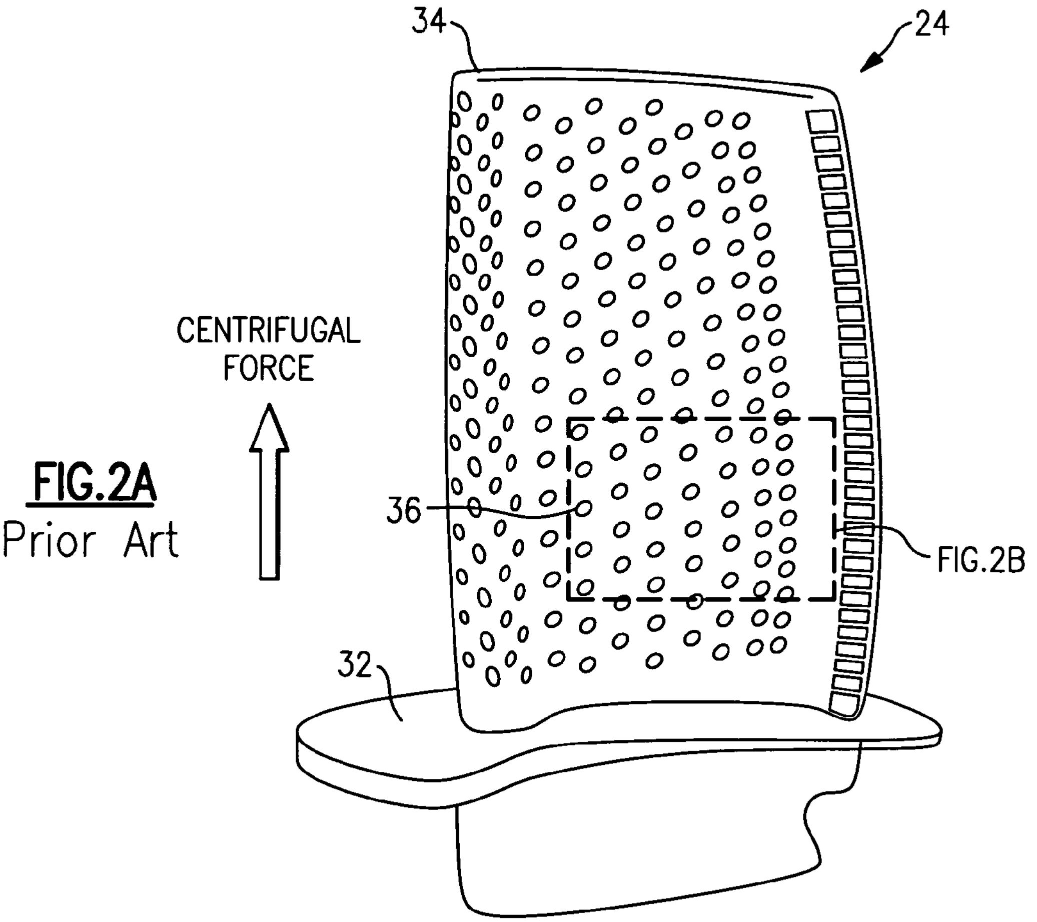
FIG.2A Prior Art
FIG. 2A is a view of a prior art turbine blade.

FIG. 2A shows a prior art turbine blade 24. As known, a platform 32 and blade root form a base for an airfoil 34. The airfoil 34 includes a plurality of film cooling holes 36. As can be appreciated, the holes 36 are formed on the pressure side 198 of the turbine blade. The holes are in an array, with holes being spaced in several columns and rows extending between the root of the airfoil and the tip, and from the trailing edge 197 toward the leading edge 199. As an example, there are several columns 200, 201, and 202 spaced between the trailing edge 197 and the leading edge 199. In addition, there are holes 202 that are closer to the root than other holes 205 or 207.

Figure 2B:
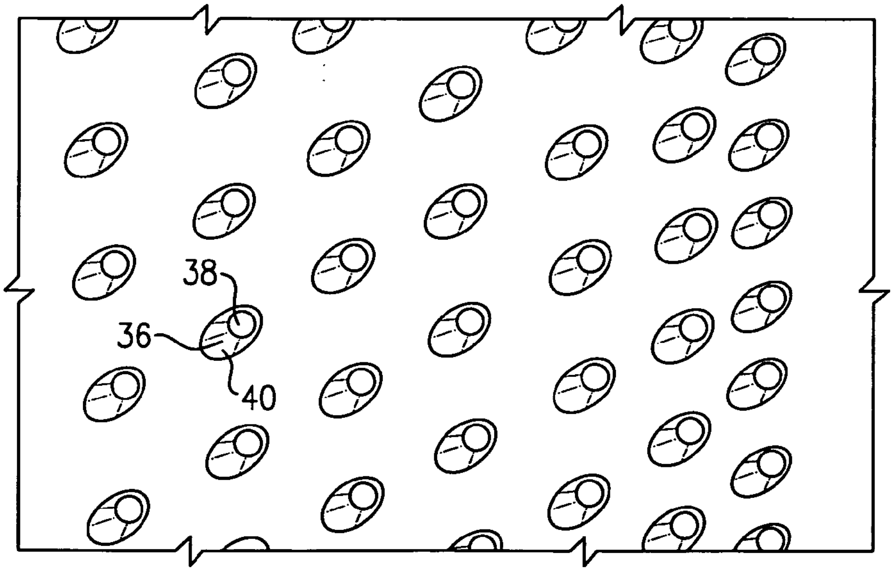
FIG.2B Prior Art
FIG. 2B is an enlarged view of a portion of the FIG. 2A turbine blade.

As shown in FIG. 2B, the film cooling holes 36 have a meter section 38, and a diffused section 40.

Figure 2C:
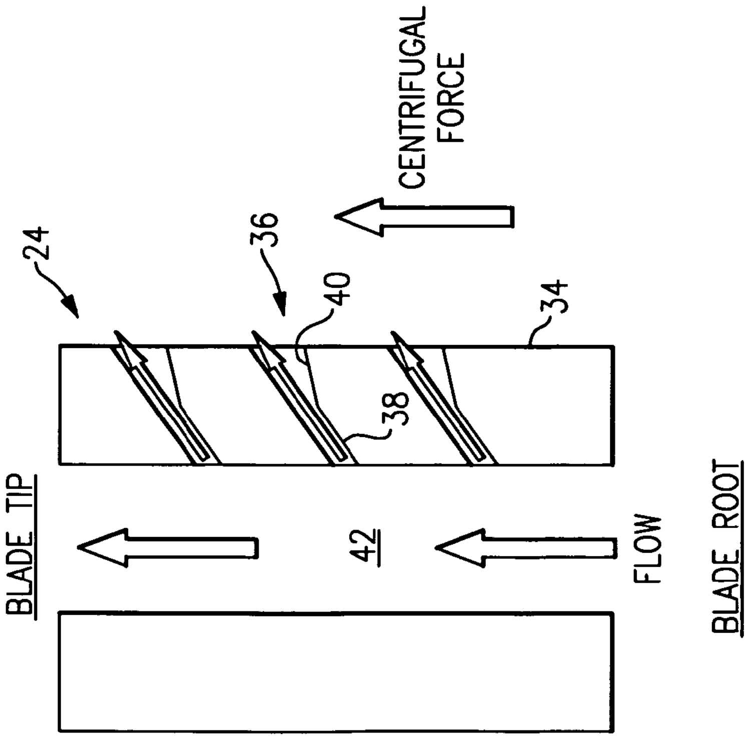
FIG.2C Prior Art
FIG. 2C is another view of the FIG. 2A blade.

As shown in FIG. 2C, the meter section 38 extends along a non-parallel angle relative to a radial axis, and with a component extending from the blade root to the blade tip. The air from an internal cooling passage 42 passes through this meter section 38 to an outer face of the airfoil 34. As can be seen in FIG. 2C, this diffused section extends from the meter section 38 and closer to the blade root than the blade tip. Now, as the turbine blade 24 rotates, centrifugal forces force air from the meter section 38 radially outwardly, and away from the diffused section 40. Thus, the diffused section 40 is not always filled.

Figure 3:
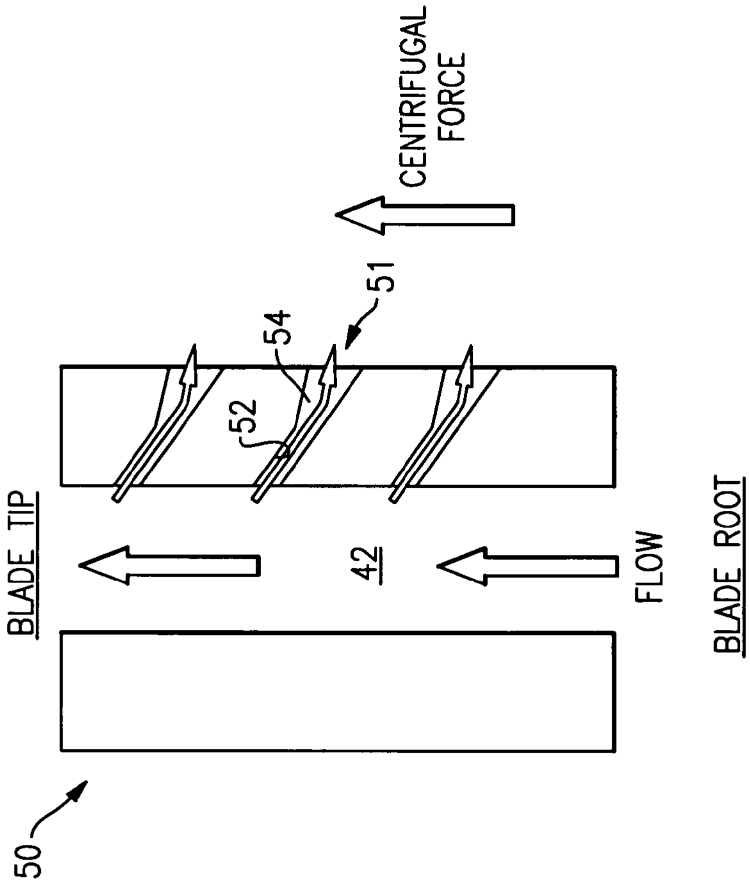
FIG. 3 is a view similar to FIG. 2C, but showing the inventive blade.

As shown in FIG. 3, in an inventive turbine blade 50, a meter section 52 extends with a main component of its direction from the blade tip to the blade root. A diffused section 54 extends toward the blade tip from the meter section 52. As can be seen, the diffused section 54 may be at an angle having a lesser component in the direction from the tip towards the root. As can be appreciated from FIG. 2, the enlarged portions 40 and 54 may not extend directly, or solely, towards the root and tip respectively. Still, they extend with a major component in those directions. As is clearly shown in FIG. 3, the meter sections 52 extend from cooling passage 42 at an angle that is initially from the blade tip toward the blade root, and at a single angle to an outer face of the airfoil. While holes 52 are shown along a single column, it should be appreciated that these holes would be utilized in an array such as shown in FIG. 2A or 2B.

When centrifugal force acts on the air in the meter section 52, the air is driven into the diffused section 54. Flow momentum will ensure that the meter section 52 is still full. Thus, the present invention ensures the cooling air is delivered to the outer face 51 across the entirety of the film cooling holes. As can be appreciated from FIG. 2B, the diffused sections 40 and 54 may not extend directly, or solely, towards the root and tip respectively. Still, they extend with a major component in those directions. It should be noted that the flow in the internal cooling passage 42 can flow in any direction and does not necessarily have to flow from blade root to blade tip.

In fact, the meter section can extend in the reverse direction or any direction with the diffused section extending toward the tip. Flow momentum will still fill the meter section while centrifugal force will fill the diffused section.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine blade comprising:

a root, and an airfoil extending away from the root to a tip;

a plurality of film cooling holes on an outer face of the airfoil, said airfoil having at least one internal cooling passage for receiving air from a source, and delivering air to said film cooling holes, and said plurality of film holes being formed in an array, with there being film holes spaced at different locations in a direction between a trailing edge and a leading edge of the airfoil, and also at different locations between the root and the tip of the airfoil; and said film cooling holes receiving air from said cooling passage through meter sections extending with a component in a direction from the tip towards the root, said meter sections extend at a first angle, with an extension of said meter section extending through to an outer wall of said airfoil, said meter sections communicating directly with said cooling passage and a diffused section of an outer end of said film cooling holes extending towards said tip from the meter section, said diffused section is formed at a different angle having a lesser component in the direction from said tip toward said root than said meter extending at.

2. The turbine blade as set fourth in claim 1, wherein said diffused section is formed along an angle having a lesser component in the direction from said tip toward said root than said meter section.

3. The turbine blade as set forth in claim 1, wherein said meter section extends from said cooling passage initially at said direction.

4. The turbine blade as set forth in claim 3, wherein said meter section extends along a single angle from said cooling passage to said outer wall of said outer face of the airfoil.

5. The turbine blade as set forth in claim 1, wherein said away of cooling holes is formed on a pressure side of said airfoil.

6. A turbine blade comprising:

a root, and an airfoil extending away from the root toward a tip;

a plurality of film cooling holes on an outer face of said airfoil, said airfoil having at least one internal cooling passage for receiving air from a source, and delivering air to said film cooling holes, and said plurality of film holes being formed in an array, with there being film holes spaced at different locations in a direction between a trailing edge and a leading edge of the airfoil, and also at different locations between the root and the tip of the airfoil; and said film cooling holes receiving air from said internal cooling passage through meter sections that extend with a component in a direction from said tip toward said root at a first angle, and a diffused section of an outer end of said film cooling holes communicates with said meter section, said diffused section extending towards said tip from said meter section and at a different angle than said meter section.

7. The turbine blade as set forth in claim 6, wherein said diffused section is formed along an angle having a lesser component in the direction from said tip toward said root than said meter section.

8. The turbine blade as set forth in claim 6, wherein said meter section extends from said cooling passage initially at said direction.

9. The turbine blade as set forth in claim 5, wherein said meter sections each extend along a single angle from said cooling passage to said outer wall of said outer face of the airfoil.

10. The turbine blade as set forth in claim 6, wherein said away of cooling holes is formed on a pressure side of said airfoil.

* * * * *